US010826349B2

(12) United States Patent
Zhu et al.

(10) Patent No.: US 10,826,349 B2
(45) Date of Patent: Nov. 3, 2020

(54) WIND TURBINE GENERATOR INCLUDING AT LEAST TWO POWER TRANSMISSION SYSTEMS CONNECTED IN PARALLEL WITH EACH OTHER AND CONTROL METHOD THEREFOR

(71) Applicant: BEIJING GOLDWIND SCIENCE & CREATION WINDPOWER EQUIPMENT CO., LTD., Beijing (CN)

(72) Inventors: Haifei Zhu, Beijing (CN); Pei Niu, Beijing (CN); Gang Deng, Beijing (CN); Xiaohe Zhang, Beijing (CN)

(73) Assignee: Beijing Goldwind Science & Creation Windpower Equipment Co., Ltd., Beijing (CN)

( * ) Notice: Subject to any disclaimer, the term of this patent is extended or adjusted under 35 U.S.C. 154(b) by 141 days.

(21) Appl. No.: 16/063,199

(22) PCT Filed: Aug. 2, 2017

(86) PCT No.: PCT/CN2017/095606
§ 371 (c)(1),
(2) Date: Jun. 15, 2018

(87) PCT Pub. No.: WO2018/068563
PCT Pub. Date: Apr. 19, 2018

(65) Prior Publication Data
US 2019/0006912 A1    Jan. 3, 2019

(30) Foreign Application Priority Data

Oct. 12, 2016   (CN) .......................... 2016 1 0890101

(51) Int. Cl.
*H02K 7/18*   (2006.01)
*H02S 10/12*   (2014.01)
(Continued)

(52) U.S. Cl.
CPC .......... *H02K 7/1838* (2013.01); *F03D 7/047* (2013.01); *F03D 17/00* (2016.05); *H02J 3/386* (2013.01);
(Continued)

(58) Field of Classification Search
CPC ...... H02K 7/183; H02K 7/1838; H02S 10/12; F03D 7/00; F03D 7/0272; F03D 7/047;
(Continued)

(56) References Cited

U.S. PATENT DOCUMENTS

| 5,237,511 A | 8/1993 | Caird et al. |
| 7,355,829 B2 | 4/2008 | Yamamura et al. |

(Continued)

FOREIGN PATENT DOCUMENTS

| CA | 2592166 A1 | 6/2006 |
| CN | 1617406 A | 5/2005 |

(Continued)

OTHER PUBLICATIONS

Extended European Search Report issued by European Patent Office for counterpart European Application No. 17860558.0, dated Aug. 19, 2019.

(Continued)

*Primary Examiner* — M. N. Von Buhr
(74) *Attorney, Agent, or Firm* — Finnegan, Henderson, Farabow, Garrett & Dunner LLP

(57) ABSTRACT

The disclosure provides a wind turbine generator and a control method thereof. The wind turbine generator comprises at least two power transmission systems connected each other in parallel and a control system comprising an upper controller and control subsystems corresponding to the power transmission systems and comprising bottom controllers. The bottom controllers monitor operating state parameters of functional units in corresponding power trans- (Continued)

mission systems, and when determining corresponding functional units meet abnormal conditions according to operating state parameters, send operating state parameters of corresponding functional units to the upper controller; the upper controller generates operating instructions when determining faults of the corresponding functional units occur according to operating state parameters of corresponding functional units, to control power transmission systems to work according to operation instructions. The wind turbine generator is fully used, and the energy production thereof is further increased.

18 Claims, 9 Drawing Sheets

(51) Int. Cl.
 F03D 7/04 (2006.01)
 F03D 17/00 (2016.01)
 H02J 3/38 (2006.01)
 F03D 9/25 (2016.01)
 F03D 7/02 (2006.01)

(52) U.S. Cl.
 CPC ............ H02S 10/12 (2014.12); *F03D 7/0272* (2013.01); *F03D 9/255* (2017.02); *F05B 2220/7066* (2013.01); *F05B 2240/40* (2013.01); *F05B 2260/80* (2013.01); *F05B 2260/845* (2013.01); *F05B 2270/502* (2013.01); *Y02E 10/72* (2013.01)

(58) Field of Classification Search
 CPC . F03D 9/25; F03D 9/255; F03D 17/00; F03D 80/60; F05B 2220/7066; F05B 2240/40; F05B 2260/80; F05B 2260/845; F05B 2270/337; F05B 2270/404; F05B 2270/502; H02J 3/386; H02J 3/381; H02J 2300/28; Y02E 10/723; Y02E 10/725; Y02E 10/72; Y02E 10/76; Y02E 10/50
 See application file for complete search history.

(56) References Cited

U.S. PATENT DOCUMENTS

| | | | | |
|---|---|---|---|---|
| 7,839,024 B2* | 11/2010 | Cardinal | ............... | F03D 7/0284 307/84 |
| 7,962,249 B1* | 6/2011 | Zhang | ................... | H02J 3/383 307/82 |
| 8,310,074 B2 | 11/2012 | Larsen et al. | | |
| 8,365,005 B2* | 1/2013 | Bengtson | ............... | G05B 15/02 702/1 |
| 8,779,610 B2* | 7/2014 | Luetze | .................... | F03D 9/255 290/44 |
| 8,803,348 B2 | 8/2014 | Groendahl et al. | | |
| 9,035,480 B2* | 5/2015 | Fortmann | ................ | H02J 3/26 290/44 |
| 9,698,715 B2 | 7/2017 | Bodewes | | |
| 10,031,048 B2* | 7/2018 | Lim | ...................... | F03D 7/048 |
| 10,180,128 B2* | 1/2019 | Barker | .................... | F03D 7/043 |
| 2005/0078424 A1 | 4/2005 | Yamamura et al. | | |
| 2006/0103137 A1 | 5/2006 | Wobben | | |
| 2009/0322082 A1* | 12/2009 | Wagoner | ............... | H02M 5/458 290/44 |
| 2011/0101689 A1 | 5/2011 | Larsen et al. | | |
| 2012/0074699 A1 | 3/2012 | Kreidler et al. | | |
| 2012/0217746 A1 | 8/2012 | Groendahl et al. | | |
| 2014/0081473 A1* | 3/2014 | Bengtson | ................. | G05B 9/02 700/287 |
| 2014/0225369 A1 | 8/2014 | Bodewes | | |
| 2016/0090965 A1* | 3/2016 | Busker | ................. | F03D 7/0264 700/287 |
| 2016/0327025 A1* | 11/2016 | Noto | ....................... | H02J 3/386 |

FOREIGN PATENT DOCUMENTS

| | | |
|---|---|---|
| CN | 101088207 A | 12/2007 |
| CN | 101702582 A | 5/2010 |
| CN | 102064563 A | 5/2011 |
| CN | 202153697 U | 2/2012 |
| CN | 102395782 A | 3/2012 |
| CN | 102651556 A | 8/2012 |
| CN | 102801239 A | 11/2012 |
| CN | 202917993 U | 5/2013 |
| CN | 103890385 A | 6/2014 |
| CN | 102891501 B | 12/2014 |
| CN | 105356629 A | 2/2016 |
| CN | 105680567 A | 6/2016 |
| CN | 106286129 A | 1/2017 |
| EP | 1312153 A1 | 5/2003 |
| EP | 1523088 A2 | 4/2005 |
| JP | 2012-231607 A | 11/2012 |
| KR | 10-2012-0017897 A | 2/2012 |
| KR | 10-2013-0066327 A | 6/2013 |
| WO | WO 2013/162089 A1 | 10/2013 |
| WO | WO 2016/011454 A1 | 1/2016 |

OTHER PUBLICATIONS

First Office Action issued in corresponding Chinese Patent Application No. 201610890101.X, dated Mar. 5, 2019.
International Search Report issued in International Application No. PCT/CN2017/095606, mailed from the State Intellectual Property Office of China dated Sep. 28, 2017.

* cited by examiner

WIND TURBINE GENERATOR INCLUDING AT LEAST TWO POWER TRANSMISSION SYSTEMS CONNECTED IN PARALLEL WITH EACH OTHER AND CONTROL METHOD THEREFOR

CROSS-REFERENCE TO RELATED APPLICATIONS

This application is a National Stage application of International Application No. PCT/CN2017/095606, titled "WIND TURBINE AND CONTROL METHOD THEREFOR" filed on Aug. 2, 2017, which claims priority to Chinese Patent Applicant No. 201610890101.X, filed on Oct. 12, 2016, the disclosures of both of which are incorporated herein by reference in their entities.

FIELD

The embodiments of the present disclosure relates to the technical field of wind power generation control, and in particular to a wind turbine generator and a control method thereof.

BACKGROUND

The wind turbine is a power generation equipment used for converting wind energy into mechanical energy for driving rotors to rotate and finally outputting the alternating current in order to ensure a normal operation of the whole wind turbine, each system of the wind turbine is required to be controlled. As for a permanent magnet direct-driven wind turbine, a torque control of the wind turbine, a cooling system control of the wind turbine, a cooling system control of a converter, a variable pitch control, a brake control, a yawing control and the like are related to during an operation of the wind turbine.

In a whole structure of the current wind turbine, although a drive motor has a multi-winding structure, a plurality of converters can also be included, and each converter adopts relatively independent structures of back to back bus, as a result of a power generation circuit composed of the driving motor, machine side switches, the converters, network side switches in series together, and the main control system performs a single main line control, therefore, in a case where a functional unit of the whole wind turbine fails, the main control system only performs identical control to the functional unit, only the multi-windings in the driving motor can be stopped at the same time or control parameters of multiple converters arranged relatively independently may be changed at the same time. As a result, in a case where one of the functional units fails, the entire power generation circuit is affected, thereby failing to make full use of the wind turbine generator and reducing the energy production of the wind turbine generator.

SUMMARY

The embodiment of the present disclosure provides a wind turbine generator and a control method thereof, solving the technical problem that in a case where a functional unit fails due to an integral series connection of functional units in the wind turbine generator and the main control system performing the single main line control in the current technology, the entire power transmission system is affected, thereby failing to make full use of the wind turbine generator and reducing energy production of the wind turbine generator.

In a first aspect, a wind turbine generator is provided in the embodiment of the present disclosure, including:
at least two power transmission systems connected in parallel with each other;
a control system, where the control system includes an upper controller and control subsystems provided correspondingly to the power transmission systems, and each of the control subsystems include bottom controllers;
where the bottom controllers are used for monitoring operating state parameters of functional units in the corresponding power transmission systems, and under the condition that it is determined that the corresponding functional units meet the abnormal conditions according to the operating state parameters, sending the operating state parameters of the corresponding functional units to the upper controller;
the upper controller is used for generating operation instructions under the condition that it is determined that the faults of the corresponding functional units occur according to the operating state parameters of the corresponding functional units and controlling the power transmission systems to work according to the operation instructions.

In a second aspect, a control method of a wind turbine generator is provided in the embodiment of the present disclosure, where the wind turbine generator includes: at least two power transmission systems connected in parallel with each other; a control system, where the control system includes an upper controller and control subsystems provided correspondingly to the power transmission systems, and each of the control subsystems includes bottom controllers;
the control method includes:
the bottom controllers monitor operating state parameters of functional units in the corresponding power transmission systems, and under the condition that it is determined that the corresponding functional units meet the abnormal conditions according to the operating state parameters, send the operating state parameters of the corresponding functional units to the upper controller;
the upper controller generates operation instructions under the condition that it is determined that the faults of the corresponding functional units occur according to the operating state parameters of the corresponding functional units and controls the power transmission systems to work according to the operation instructions.

The embodiment of the present disclosure provides a wind turbine generator and a control method thereof. The wind turbine generator includes at least two power transmission systems connected in parallel with each other; a control system, where the control system includes an upper controller and control subsystems provided correspondingly to the power transmission systems, and each of the control subsystems include bottom controllers; where the bottom controllers are used for monitoring operating state parameters of functional units in the corresponding power transmission systems, and under the condition that it is determined that the corresponding functional units meet the abnormal conditions according to the operating state parameters, sending the operating state parameters of the corresponding functional units to the upper controller; and the upper controller is used for generating operation instructions under the condition that it is determined that the faults of the corresponding functional units occur according to the operating state parameters of the corresponding functional units and controlling the power transmission systems to work according to the operation instructions. Since all the power transmission systems are connected in parallel with each other, the same functional units of the power transmission systems are independent of each other, in a case where a functional unit fails, only the power transmission system where the functional unit is located is affected, and the normal operation of other power transmission systems is not affected. The bottom controllers may monitor the corresponding functional units independently, and after the upper controller determines that the corresponding functional units fail, the upper controller generates the operation instructions to control the faulty power transmission systems to work according to the operation instructions and the normal operation of the non-faulty power transmission systems is not affected. Therefore the wind turbine generator is made full use of, thereby increasing the energy production of the wind turbine generator.

BRIEF DESCRIPTION OF THE DRAWINGS

In order to more clearly illustrate technical solutions of the embodiments of the present disclosure or those of the conventional technology, accompanying drawings to be used in the description of the embodiments or the conventional technology are briefly described below. Obviously, the accompanying drawings in the following description are only some embodiments of the present disclosure, and other accompanying drawings may be obtained by those skilled in the art according to the accompanying drawings provided herein without any creative work.

Figure 1:
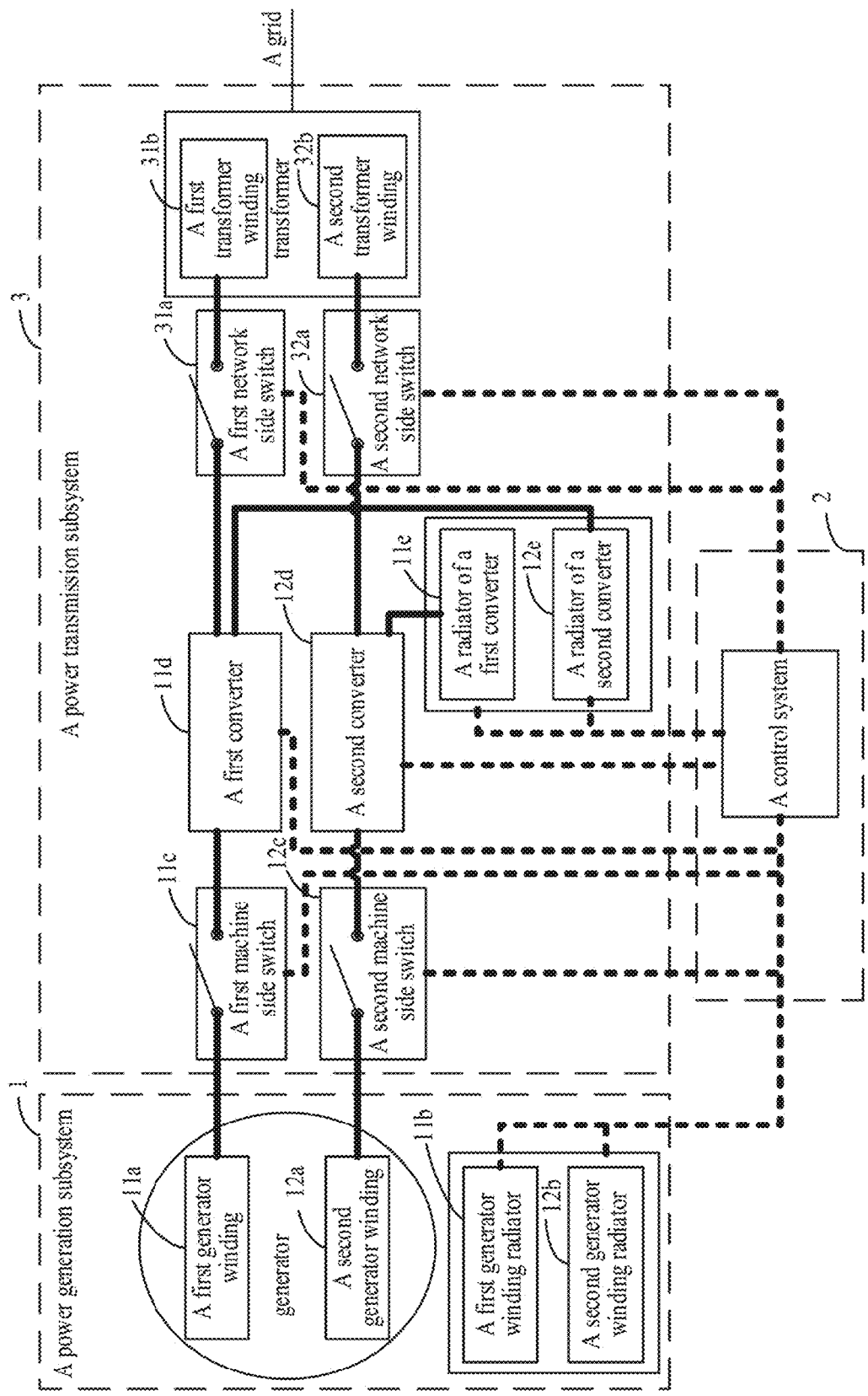
FIG. 1 is a schematic structural diagram of a wind turbine generator according to the present disclosure.

REFERENCE NUMBERS 1-a power generation subsystem 11a—a first generator winding 11b—a first generator winding radiator 11c—a first machine side switch 11d—a first converter 11e—a radiator of the first converter 12a—a second generator winding 12b—a second generator winding radiator 12c—a second machine side switch 12d—a second converter 12e—a radiator of a second converter 2—a control system 21—a bottom controller 211—a central control module of a converter 211a1—a rectifier control sub-module of a first converter 211a2—an inverter control sub-module of a first converter 211b1—a rectifier control sub-module of a second converter 211b2—an inverter control sub-module of a second converter 212—a switch control module 213—a radiator control module of a generator winding 214—a radiator control module of a converter 22—an upper controller 221—a fault type determination unit 222—an operation mode determination unit 223—an operation instruction generation unit 223a—a first operation instruction generation module 223b—a second operation instruction generation module 223c—a third operation instruction generation module 224—a removal control unit of a faulty power transmission system 225—a deployed control parameter calculation unit 226—a control unit of a non-faulty power transmission system 3—a power transmission subsystem 31a—a first network side switch 31b—a first transformer winding 32a—a second network side switch 32b—a second transformer winding 501—a third branch circuit current curve on the U phase (Coil#1u3) 502—a seventh branch circuit current curve on the U phase (Coil#1u7) 503—a third branch circuit current curve on the V phase (Coil#1v3) 504—a seventh branch circuit current curve on the U phase (Coil#1v7) 505—a first branch circuit current curve on the W phase (Coil#1w1) 506—a ninth branch circuit current curve on the W phase (Coil#1w9) 507—a current circulation curve on the W phase 508—a current circulation curve on the V phase 509—a current circulation curve on the U phase

DETAILED DESCRIPTION

In order to make the purpose, technical solutions and the advantages of the embodiments of the present disclosure clearer, in the following, the present disclosure will be described clearly and completely in conjunction with the drawings. Apparently, the described embodiments are only a part of embodiments of the present disclosure, rather than all the embodiments. All other embodiments obtained by those skilled in the art based on these embodiments of the present disclosure without any creative work fall within the protection scope of the present disclosure.

It should be understood that the term "and/or" used in the disclosure is only an incidence relation of describing associated objects, indicating that there can be three kinds of relations, A and/or B, can indicate three conditions: A separately exists, both A and B exist, and B separately exists. In addition, the character "/" in the disclosure generally indicates that the associated objects are an "or" relationship.

Depending on the context, the word "if" used here may be explained as "in a case where" or "when" or "In response to a determination" or "In response to a detection". Similarly, depending on the context, the phrase "if it is determined" or "if it is detected (the condition or event of a statement)" may be explained as "when it is determined" or "when it is detected (the condition or event of a statement)" or "in response to detecting (the condition or event of a statement)".

FIG. 1 is a schematic structural diagram of a first embodiment of a wind turbine generator according to the present disclosure, and the wind turbine generator provided in the embodiment includes: at leak two power transmission systems and a control system. At least two power transmission systems are connected in parallel to each other, and each of the power transmission systems has the same functional units. Each of the power transmission systems may generate power independently, or generate power in parallel. The control system includes an upper controller and control subsystems provided correspondingly to the power transmission systems, and each of the control subsystems includes bottom controllers.

In the embodiment, circumstances of only two power transmission systems are shown in FIG. 1, and according to a demand for the energy production, three power transmission systems, four power transmission systems and the like may also be adopted, which are not limited in the embodiment. The wind turbine generator can be a permanent magnet direct-driven generator system or doubly-fed wind turbine generator or other type, which are not limited in the embodiment.

In some embodiments, the wind turbine generator includes at least two power transmission systems, where all power transmission systems are connected in parallel with each other, each of the power transmission systems has the same functional units, the functional units of the same type in the power transmission system are independent of each other. Therefore, there is a redundant power transmission system in the wind turbine generator.

In some embodiments, all sets of power transmission system respectively in power generation subsystem and a power transmission subsystem.

The functional units of the power generation subsystem include: generator windings and generator winding radiators; the functional units of the power transmission subsystem include: machine side switches, converters, radiators of converters, network side switches and transformer windings. Where the generator windings, the machine side switches, the converters, the network side switches and the transformer windings are connected in series in turn, the generator winding radiators are used for cooling the generator windings, the radiators of converters are used for cooling the converters.

As shown in FIG. 1, a first power generation subsystem includes a first generator winding 11a, and a first generator winding radiator 11b. A first power transmission subsystem includes a first machine side switch 11c, a first converter 11d, a radiator of the first converter 11e, a first network side switch 31a and a first transformer winding 31b.

A second power generation subsystem includes a second generator winding 12a, and a second generator winding radiator 12b. A second power transmission subsystem includes a second machine side switch 12c, a second converter 12d, a radiator of the second converter 12e, a second network side switch 32a and a second transformer winding 32b.

In FIG. 1, circuits connected between the control system and each functional unit are control circuits, circuits connected between each functional unit are power transmission circuit.

In some embodiments, the generator windings of at least two power generation subsystems are double winding or multi-winding, the double winding may be set as double Y winding. The converters of each power transmission subsystem may be relatively independent structures of a back to back bus. Both the generator winding radiator and the radiator of the converter in each of power transmission subsystems may be duplex pump structures. Types of the machine side switches and the network side switches are not limited herein.

For each functional unit in power transmission subsystems, a corresponding bottom controller is provided, where one end of the bottom controller is connected to the corresponding functional unit, another end of the bottom controller is connected to the upper controller.

In some embodiments, the bottom controllers are used for monitoring operating state parameters of the functional units in the corresponding power transmission system, and under the condition that it is determined that the corresponding functional units meet the abnormal conditions according to the operating state parameters, sending the operating state parameters of the corresponding functional units to the upper controller.

The upper controller is used for generating operation instructions under the condition that it is determined that the faults of the corresponding functional units occur according to the operating state parameters of the corresponding functional units, and controlling the faulty power transmission systems to work according to the operation instructions.

Figure 7:
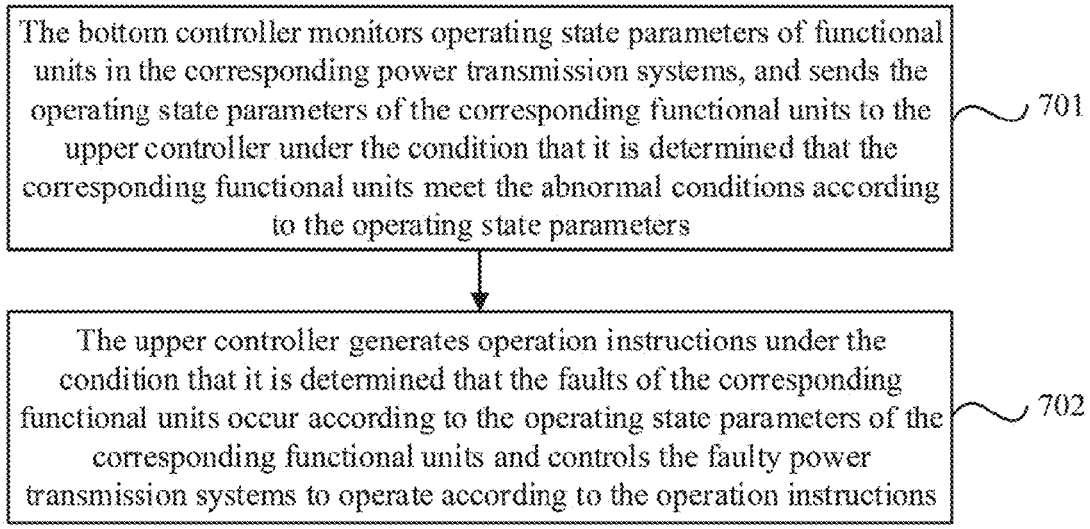
FIG. 7 is a flow chart of a control method of a wind turbine generator according to the present disclosure.

In order to understand the embodiment better, a control method of the wind turbine generator determined through the structure and position relations of components may refer to FIG. 7. In practical application, the operating state parameters of the functional units in the power transmission systems monitored by each bottom controller correspondingly may vary according to the functional units. For the converter, operation temperatures of a rectifier module, an inverter module and a filter module in the converter and heart beat signals of the converter may be monitored. For the generator winding, the monitored operating state parameters may be whether three-phase currents is balanced, temperatures of the generator winding and the like.

In some embodiments, the method of each bottom controller determining whether the corresponding functional units meet the abnormal conditions according to the operating state parameters may include: pre-storing a numerical range of the abnormal operating state parameters of each functional unit; comparing the value of the monitored operating state parameters to the numerical range of the abnormal operating state parameters of each functional unit; in a case where the value of the monitored operating state parameters falls in the numerical range of the abnormal operating state parameters, determining that the corresponding functional unit meets the abnormal conditions. The method of determining whether the corresponding functional unit meets the abnormal conditions may be other methods, which are not limited in the embodiment.

In some embodiments, the method of the upper controller determining whether the faults of the corresponding functional units occur according to the operating state parameters of the corresponding functional units is not limited herein. The abnormal conditions of each functional unit may be pre-stored, whether the operating state parameters of the corresponding functional units meet the abnormal conditions is determined, and if the determination is affirmative, it is determined that the faults of the corresponding functional unit occur. Other methods may also be adopted to determine whether the faults of the corresponding functional unit occur, which are not limited in the embodiment.

In some embodiments, after determining that the faults of the corresponding functional unit occur under a condition that it is determined that the faults of the corresponding functional unit occur according to the operating state parameters of the corresponding functional units, the operation instructions may be generated automatically, or after receiving enable signals, the operation instructions may also be generated, to control the faulty power transmission system to work according to the operation instructions. The operation instructions may be an instruction of removing the faulty power transmission system, or an instruction of adjusting the operating state of the faulty power transmission system, such as an instruction of adjusting the operating parameters in the faulty power transmission system to restore the faulty power transmission system to normal, or an instruction of controlling the operating states of the non-faulty power transmission system.

In some embodiments, in a case where the upper controller controls the faulty power transmission system to work according to the operation instructions, since the faulty power transmission system and the non-faulty power transmission system are connected in parallel with each other, the non-faulty power transmission system may operate normally and continue generating and transmitting the power.

The wind turbine generator provided in the present embodiment includes: at least two power transmission systems, where the power transmission systems are connected in parallel with each other; a control system, where the control system includes an upper controller and control subsystems provided correspondingly to all the power transmission systems, and each of the control subsystems includes bottom controllers; where the bottom controllers are used for monitoring operating state parameters of the functional units in the corresponding power transmission systems, and under the condition that it is determined that the corresponding functional units meet the abnormal conditions according to the operating state parameters, sending the operating state parameters of the corresponding functional units to the upper controller; the upper controller is used for generating operation instructions under the condition that it is determined that the faults of the corresponding functional units occur according to the operating state parameters of the corresponding functional units and controlling the power transmission systems to work according to the operation instructions. Since all the power transmission systems are connected in parallel with each other, the same functional units of the power transmission systems are independent of each other, two power transmission systems may operate at the same time, therefore, in a case where a functional unit fails, only the power transmission system where the functional unit is located is affected, and the normal operation of other power transmission systems is not affected, and the bottom controllers may monitor the corresponding functional units independently. After the upper controller determines that the corresponding functional units fail, the operation instructions are generated to control the faulty power transmission systems to work according to the operation instructions and the normal operation of the non-faulty power generation circuit is not affected, therefore the wind turbine generator is made full use of, thereby increasing the energy production of the wind turbine generator.

Figure 2:
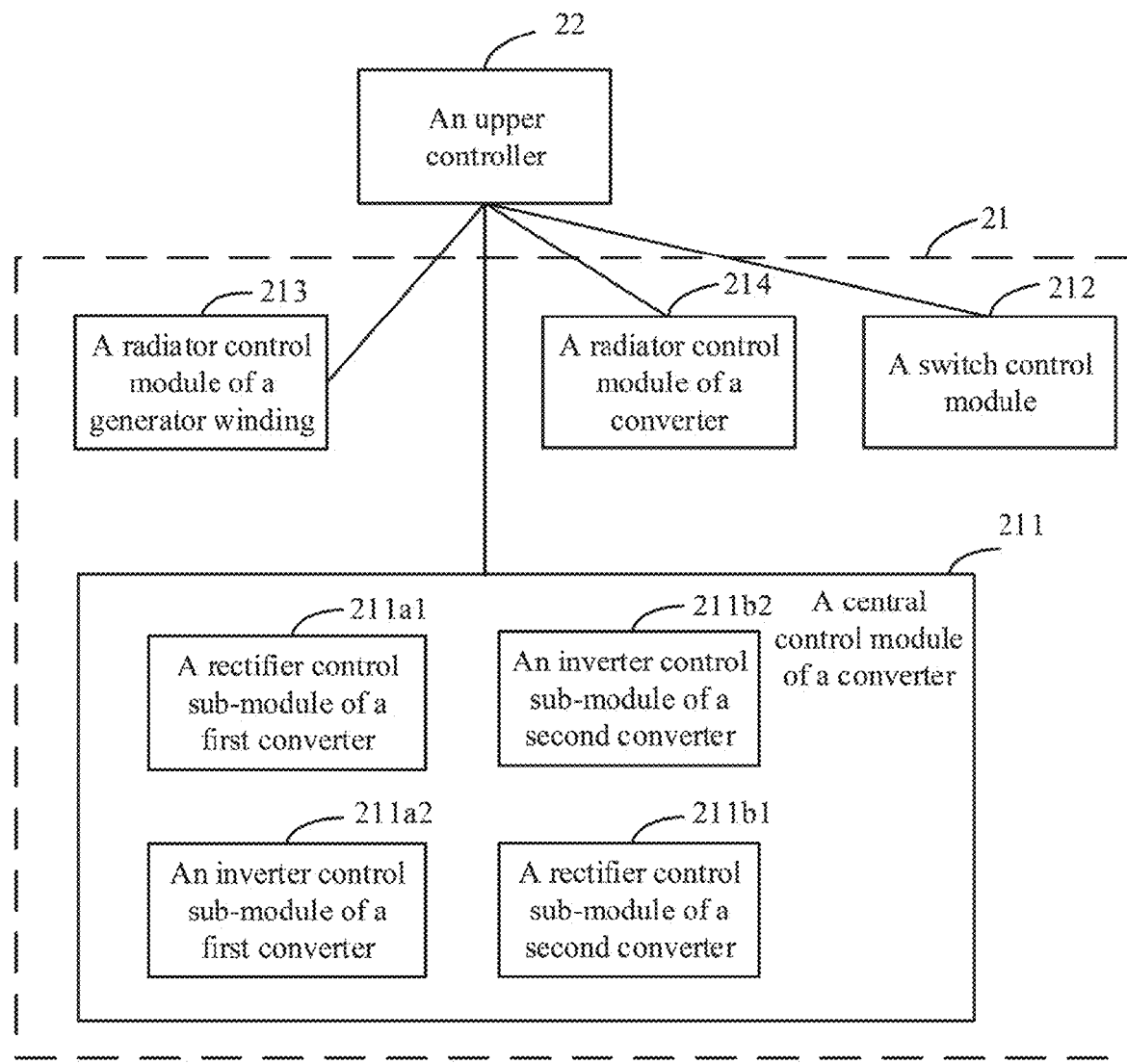
FIG. 2 is a schematic structural diagram of a control system of a wind turbine generator according to the present disclosure.

FIG. 2 is a schematic structural diagram of a control system of a wind turbine generator according to the present disclosure. Except for the bottom controllers of the converter, only one set of other bottom controllers and the upper controller is shown in FIG. 2. There are two the bottom controllers corresponding to the converter. As shown in FIG. 2, the wind turbine generator provided in the present embodiment further defines the bottom controllers and the upper controller of the control system based on the first embodiment of the wind turbine generator of the present disclosure, the wind turbine generator provided in the present embodiment includes following features.

The bottom controllers in each of the control subsystems of the control system includes: a central control module of a converter 211, a switch control module 212, a radiator control module of a generator winding 213 and a radiator control module of a converter 214.

The central control module of the converter 211 is used for controlling and managing the whole converter.

In some embodiments, the central control module of the converter 211 includes: a rectifier control sub-module and an inverter control sub-module.

The rectifier control sub-module is used for controlling the working state of the rectifier module of the converter in the power transmission system and monitoring the operating state parameters of the rectifier module. The inverter control sub-module is used for controlling the working state of the inverter module of the converter in the power transmission system and monitoring the operating state parameters of the inverter module.

The central control module of the converter 211 shown in FIG. 2 includes: a rectifier control sub-module of a first converter 211a1, an inverter control sub-module of a first converter 211a2, a rectifier control sub-module of a second converter 211b1 and an inverter control sub-module of a second converter 211b2.

In some embodiments, the rectifier control sub-module monitors the operating state parameters of the rectifier module of the converter in the power transmission system, under the condition that it is determined that the rectifier module meets the abnormal conditions according to the operating state parameters, sends the operating state parameters of the rectifier module to the central control module of the converter, and further to the upper controller through the central control module of the converter. The upper controller generates the operation instructions under the condition that it is determined that the faults of the rectifier module occur according to the operating state parameters of the rectifier module, and controls the working state of the rectifier module of the converter in the power transmission system through the central control module of the converter and rectifier control sub-module.

Similarly, the inverter control sub-module monitors the operating state parameters of the inverter module of the converter in the power transmission system, and under the condition that it is determined that the inverter module meets the abnormal conditions according to the operating state parameters, sends the operating state parameters of the inverter module to the central control module of the converter, and further to the upper controller through the central control module of the converter. The upper controller generates the operation instructions under the condition that it is determined that the faults of the inverter module occur according to the operating state parameters of the inverter module, and controls the working state of the inverter module of the converter in the power transmission system through the central control module of the converter and the inverter control sub-module.

In some embodiments, the switch control module 212 is used for controlling the working state of the machine side switches and the network side switches.

Preferably, the central control module of the converter 211 is provided in the converter, it may be understood that the rectifier control sub-module and the inverter control sub-module are also provided in the converter.

Preferably, the switch control module 212, the radiator control module of the generator winding 213 and the radiator control module of the converter 214 are provided in a main control cabinet.

It should be noted that the central control module of the converter controls both the converter and the generator winding.

The bottom controllers of the wind turbine generator provided in the embodiment include: the central control module of the converter, the switch control module, the radiator control module of the generator winding and the radiator control module of the converter. Where the central control module of the converter includes the rectifier control sub-module and the inverter control sub-module. The rectifier control sub-module is used for controlling the working state of the rectifier module of the converter in the power transmission system and monitoring the operating state parameters of the rectifier module. The inverter control sub-module is used for controlling the working state of the inverter module of the converter in the power transmission system and monitoring the operating state parameters of the inverter module. The switch control module is used for controlling the working state of the machine side switches and the network side switches.

Preferably, the upper controller, the switch control module, the radiator control module of the generator winding and the radiator control module of the converter are provided in a main control cabinet, the central control module of the converter is provided in the converter, which is more convenient to monitor the operating state parameters of the functional units in the power generation circuit and manage the controller.

Figure 3:
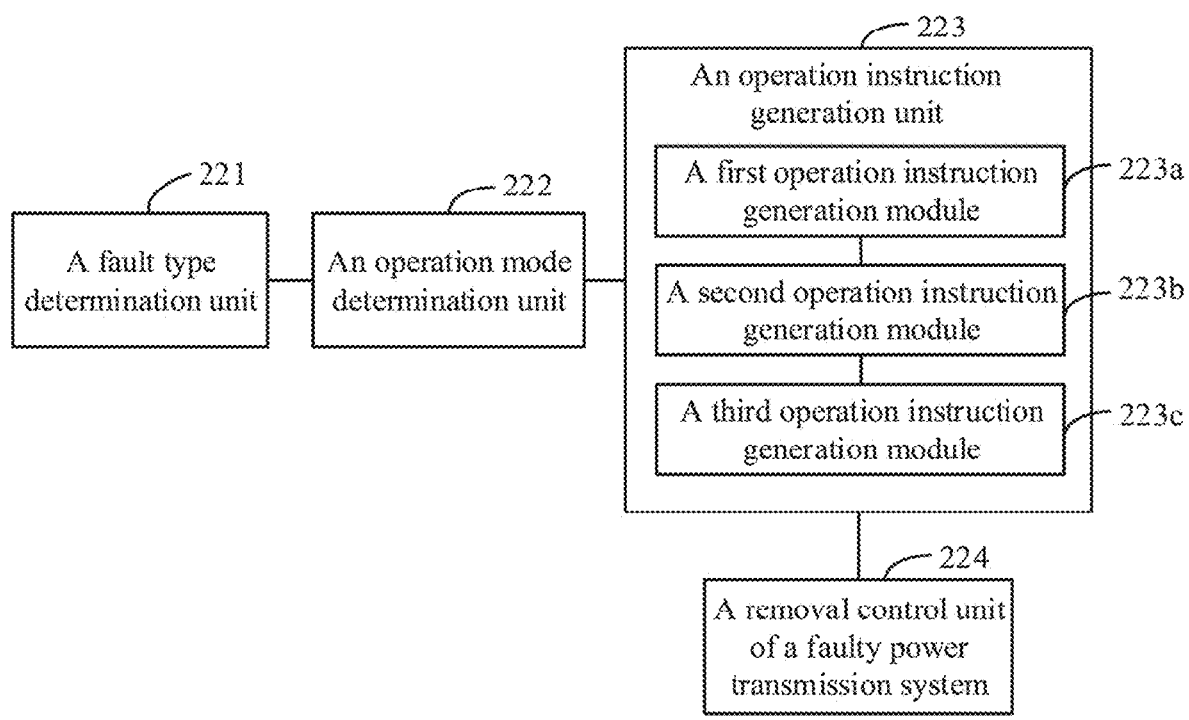
FIG. 3 is a schematic structural diagram of an upper controller of a wind turbine generator according to the present disclosure.

FIG. 3 is a schematic structural diagram of an upper controller of a wind turbine generator according to the present disclosure. As shown in FIG. 3, the wind turbine generator provided in the present embodiment further defines the upper controller based on the second embodiment of the wind turbine generator of the present disclosure, and the wind turbine generator provided in the present embodiment further includes following features.

The upper controller of the wind turbine generator provided in the present embodiment specifically includes: a fault type determination unit 221, an operation mode determination unit 222 and an operation instruction generation unit 223.

In some embodiments, the fault type determination unit 221 is used for determining whether the faults of the corresponding functional units occur according to the operating state parameters of the corresponding functional units, and if the faults occur, the type of the fault is determined.

Specifically, in the embodiment, the fault type determination unit 221 may classify the fault of the power transmission system in advance and pre-store the fault type. After determining that the faults of the corresponding functional units occur according to the operating state parameters of the corresponding functional units, the fault type of the corresponding functional unit is determined according to the pre-stored fault type.

In some embodiments, the operation mode includes anyone of following modes:

An online automatic removing mode, an offline automatic removing mode and a passive removing mode.

The online automatic removing mode is a mode that the faulty power transmission system is controlled to be removed automatically without getting down. The offline automatic removing mode is a mode that the faulty power transmission system can be automatically controlled to be removed after getting down and restarting. The passive removing mode is a mode that the technician manually sends out the removing enable signal, and faulty power transmission system is controlled to be removed by the control system.

In some embodiments, the fault type determination unit 221 may classify the fault type according to the operation mode. The fault type that the online automatic removing mode may be adopted is divided as a first type of the fault, the fault type that the offline automatic removing mode may be adopted is divided as a second type of the fault, the fault type that the passive removing mode may be adopted is divided as a third type of the fault.

In some embodiments, the operation mode determination unit 222 connected to the fault type determination unit 221, is used for determining the operation mode of the faulty power transmission system according to the corresponding relations between the pre-stored fault types and operation modes.

In some embodiments, the operation mode determination unit 222 pre-stores the corresponding relations between the fault types and the operation modes. That is, the first type of the fault corresponds to the online automatic removing mode, the second type of the fault corresponds to the offline automatic removing mode, and the third type of the fault corresponds to the passive removing mode. According to the fault type to which the corresponding functional units belong, the corresponding relations between the pre-stored fault types and the operation modes are searched to determine the removing mode corresponding to the fault type to which the corresponding functional units belong.

In some embodiments, the operation instruction generation unit 223 connected to the operation mode determination unit 222, is used for generating the operation instructions according to the operation mode.

In some embodiments, the operation instruction generation unit 223 includes: a first operation instruction generation module 223a, a second operation instruction generation module 223b and a third operation instruction generation module 223c.

In a case where the operation mode is the online automatic removing mode, the first operation instruction generation module 223a is used for generating the removing instruction automatically in a state where the operation of the wind turbine generator is not stopped.

In a case where the operation mode is the offline automatic removing mode, the second operation instruction generation module 223b is used for controlling the wind turbine generator to stop the operation and determining whether the wind turbine generator has been restarted, and in a case where the wind turbine generator has been restarted, the second operation instruction generation module 223b generates the removing instruction automatically.

In a case where the operation mode is the passive removing mode, the third operation instruction generation module 223c is used for determining whether the removing enable signal is received, and in a case where the removing enable signal is received, the third operation instruction generation module 223c generates the removing instruction according to the removing enable signal.

Specifically, in the embodiment, in a case where the operation mode is the passive removing mode, the third operation instruction generation module 223c sends the prompt information to the central control device, so that after the technician reconfirms the fault, if the other non-faulty power transmission system may continue generating power through removing the faulty power transmission system, the technician sends the removing enable signal to the upper controller through the central control device, and the third operation instruction generation module 223c generates the removing instruction according to the removing enable signal.

In some embodiments, the upper controller further includes: a removal control unit of a faulty power transmission system 224.

The removal control unit of the faulty power transmission system 224 connected to the operation instruction generation unit 223, is used for controlling the faulty power transmission system to stop working according to the removing instruction and be removed from the wind turbine generator.

Therefore, in the embodiment, after generating the removing institution by the first operation instruction generation module 223a, the second operation instruction generation module 223b and the third operation instruction generation module 223c, the removal control unit of the faulty power transmission system 224 controls the faulty power transmission system to stop working according to the removing instruction.

The wind turbine generator provided in the embodiment monitors the operating state parameters of the functional units in the corresponding power transmission system through the bottom controllers, and under the condition that it is determined that the corresponding functional units meet the abnormal conditions according to the operating state parameters, the operating state parameters of the corresponding functional units are sent to the upper controller, and the fault type determination unit of the upper controller determines whether the faults of the corresponding functional units occur according to the operating state parameters of the corresponding functional units and determines a fault type if the faults occur. The operation mode determination unit determines the operation mode of the power transmission system according to the fault type and the corresponding relations between the pre-stored fault types and the operation modes, and the operation instruction generation unit generates the operation instructions according to the operation mode.

The operation mode is the online automatic removing mode, the offline automatic removing mode or the passive removing mode. The operation instructions are the removing instructions, and the removal control unit of the faulty power transmission system controls the faulty power transmission system to stop working according to the removing instruction, so that the faulty power transmission system is removed from the wind turbine generator. Not only the wind turbine generator is made full use of, but also the energy production of the wind turbine generator is increased. For a variety of fault types, if the fault may not be restored, the faulty power transmission system can be removed directly.

Figure 4:
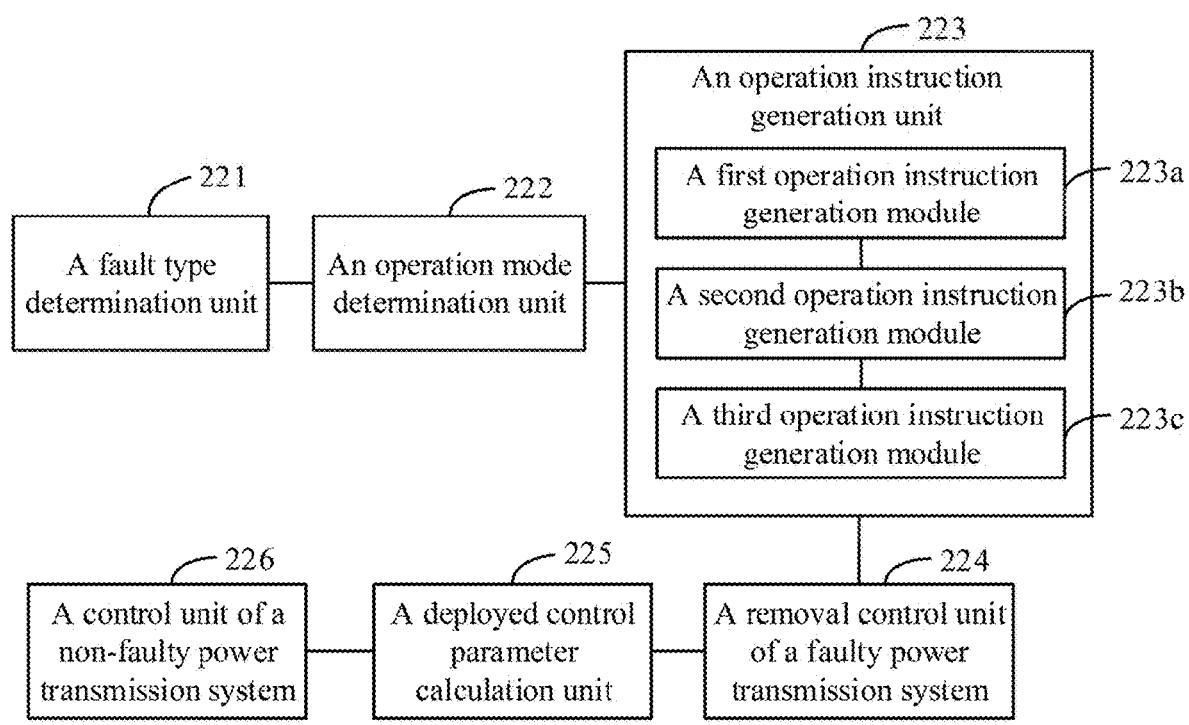
FIG. 4 is a schematic structural diagram of an upper controller of a wind turbine generator according to the present disclosure.

FIG. 4 is a schematic structural diagram of an upper controller of a wind turbine generator according to the present disclosure. As shown in FIG. 4, the wind turbine generator provided in the present embodiment further defines the upper controller based on the third embodiment of the wind turbine generator of the present disclosure.

In some embodiments, the upper controller further includes: a deployed control parameter calculation unit 225 and a control unit of a non-faulty power transmission system 226.

The deployed control parameter calculation unit 225 is used for calculating deployed control parameters in a non-faulty power transmission system.

In some embodiments, the deployed control parameters, include: such as, torque setting values, given reactive values, inductance values, resistance values and magnetic chain data of the generator in the non-faulty power transmission system.

The deployed control parameters may further include: the deployed control parameters of restraining circulation currents and the like.

The inductance values, the resistance values and the magnetic chain data of the generator in the non-faulty power transmission system are parameters of the generator windings in the non-faulty power transmission system.

In some embodiments, the parameters of the generator windings in the non-faulty power transmission system are determined through a simulation and a test after removing the faulty power transmission system, or after removing the faulty power transmission system, the central control module of the converter acquires changes in the current and the voltage of the converter in the non-faulty power transmission system, to send them to the upper controller, so that the upper controller calculates the parameters of the windings in the non-faulty power transmission system according to the changes in the current and the voltage.

The control unit of the non-faulty power transmission system 226 connected to the deployed control parameter calculation unit 225, is used for controlling the operation state of the non-faulty power transmission system according to the deployed control parameters.

In some embodiments, the deployed control parameter calculation unit 225 controls the operation state of the generator in the non-faulty power transmission system according to the torque setting values, the given reactive values, the inductance values, the resistance values and the magnetic chain data of the generator in the deployed control parameters, enabling the generator to increase the energy production and meet the demand. And the deployed control parameter calculation unit 225 may control the circulation currents in the generator windings according to the deployed control parameters of restraining the circulation currents.

In the wind turbine generator provided in the embodiment, the bottom controller monitors the operating state parameters of the functional units in the corresponding power transmission system, and under the condition that it is determined that the corresponding functional units meet the abnormal conditions according to the operating state parameters, sends the operating state parameters of the corresponding functional units to the upper controller, so that the upper controller determines whether the faults of the corresponding functional units occur according to the operating state parameters of the corresponding functional units, and if the faults occur, the upper controller determines the fault type, determines the operation mode of the power transmission system according to the fault type and the corresponding relations between the pre-stored fault types and the operation modes, and generates the operation instructions according to the operation mode. The operation mode is the online automatic removing mode, the offline automatic removing mode or the passive removing mode. The operation instructions are the removing instructions, which control the faulty power transmission system to stop working according to the removing instruction, enabling the faulty power transmission system to be removed from the wind turbine generator. The deployed control parameter calculation unit of the upper controller calculates the deployed control parameters of the non-faulty power transmission system, the control unit of the non-faulty power transmission system is used for controlling the operation state of the non-faulty power transmission system according to the deployed control parameters, thereby not only making full use of the wind turbine generator, but also increasing the energy production of the wind turbine generator. And after the faulty power transmission system is removed, the non-faulty power transmission system can also meet the demand of power generation.

Since the generators in the wind turbine generator provided in the embodiment adopt a double winding or a multi-winding structure, in a case where a power transmission system is not removed, three phases of U/V/W of each set of the generator winding are uniform and symmetrical in space, and there is not the circulation currents existing between different branches of the same phase arranged in parallel. Since after the faulty power transmission system is removed, the three phases of U/V/W of the remaining generator winding are not uniform and symmetrical in space, there is the circulation currents existing between different branches of the same phase arranged in parallel, which may cause a local overheating on the generator winding and generate radial forces and tangential forces of corresponding frequencies on the magnetic poles, and act with a base wave of the inductive electromotive force synthetically and generate ripple torques. The increasing of the radial forces and tangential forces on the magnetic poles and the new generated ripple torques may cause a large vibration of the generator and affect the life of the generator. And the vibration of the generator may generate noise tones of a corresponding frequency.

Taking a direct-driven permanent-magnet generator as an example, in a case where the direct-driven permanent-magnet generator has two power transmission systems, after the faulty power transmission system is removed, the current change of the winding of the non-faulty power transmission system over time and the force of the magnetic pole are collected.

Figure 5:
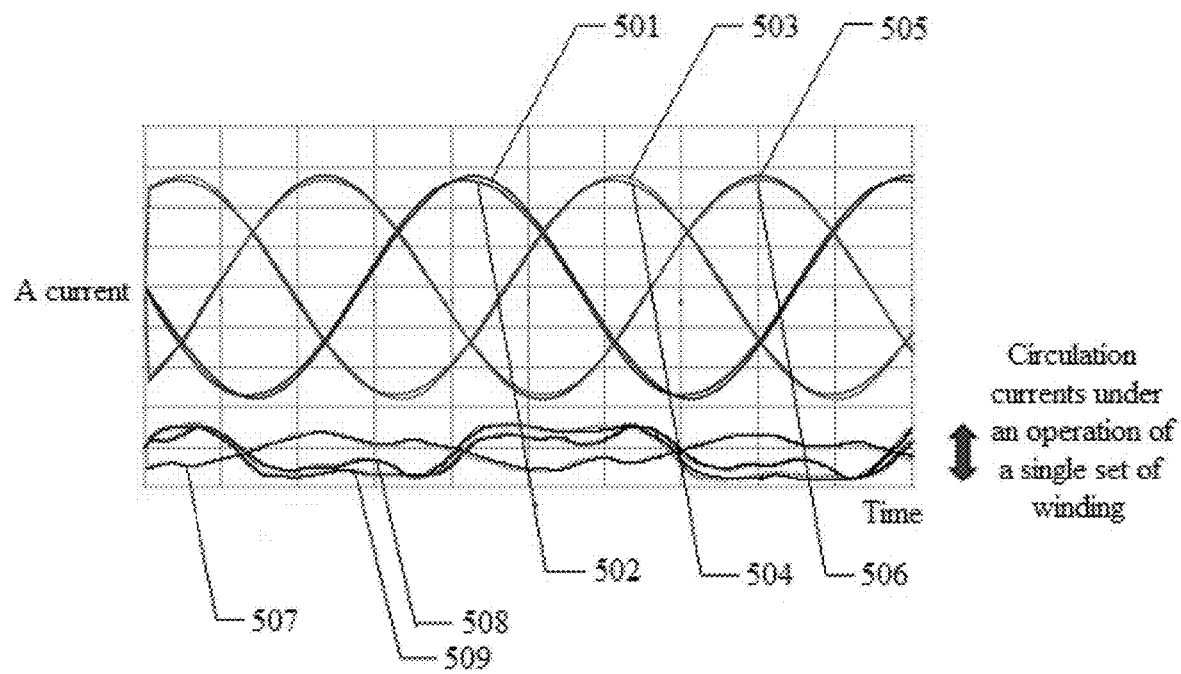
FIG. 5 is a schematic diagram showing how a current of a generator winding of a non-faulty power transmission system changes over time.

FIG. 5 is a schematic diagram showing how a current of a generator winding of a non-faulty power transmission system changes over time. FIG. 5 shows the currents of the three phases of U/V/W of the single winding of the generator in the non-faulty power transmission system, each phase includes 8 branches arranged in parallel, and the current of each of 8 branches of the same phase are collected to acquire a maximum current and a minimum current. A curve 501 and a curve 502 in FIG. 5 are a current curve of a third branch of the U phase and a current curve of a seventh branch on the U phase respectively, which are the maximum current and the minimum current of the U phase. Similarly, a curve 503 and a curve 504 are a current curve of a third branch of the V phase and a current curve of a seventh branch of the V phase respectively, which are the maximum current and the minimum current of the V phase. A curve 505 and a curve 506 are a current curve of a first branch of the W phase and a current curve of a ninth branch of the W phase respectively, which are the maximum current and the minimum current of the W phase. Bottom three curves in FIG. 5 are curves formed by the current difference between the branch of the maximum current and the branch of the minimum current of each phase respectively, which are the corresponding circulation currents respectively. A curve 509 is the circulation current of the U phase, a curve 508 is the circulation current of the V phase, a curve 507 is the circulation current of the W phase. It is known that the maximum circulation current is 5.7% of a rated current through comparing a maximum circulation current to the maximum current.

Figure 6:
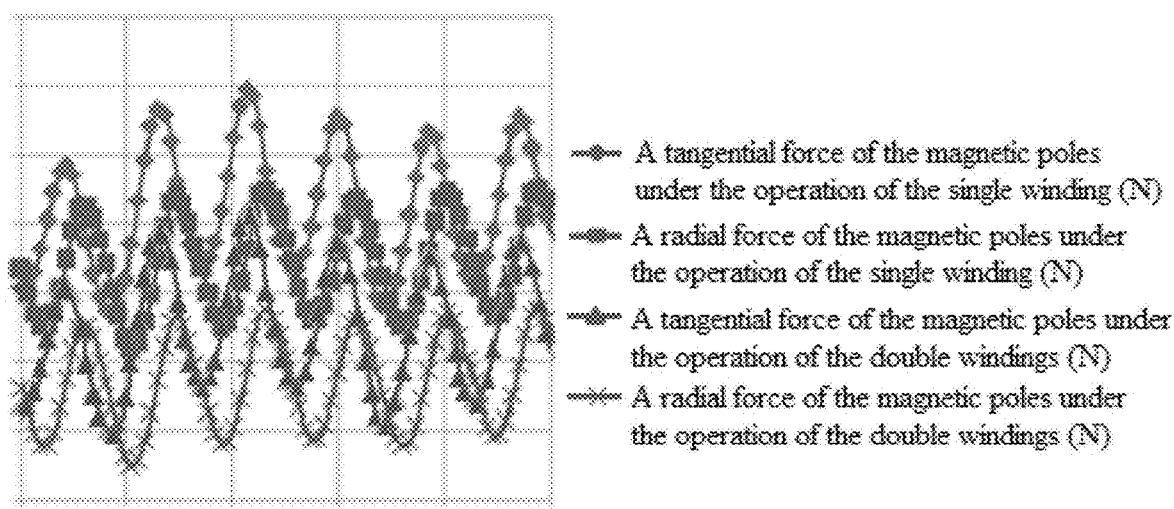
FIG. 6 is a schematic diagram showing a force of a magnetic pole of a generator winding of a power transmission system.

FIG. 6 is a schematic diagram showing a force of a magnetic pole of a generator winding of a power transmission system. As shown in FIG. 6, four curves in Figure are changing curves of the tangential force and the radial force of the magnetic pole over the time under the operation of a double winding or a single winding respectively. It may be known from FIG. 6, after the faulty power transmission system is removed, the tangential force and the radial force of the single magnetic pole may increase a lot under the operation of the single winding of the non-faulty power transmission system, and the increase is about 3%.

In order to restrain the influence of the non-faulty power transmission system caused by removing the faulty power transmission system, restrain the vibration of the generator and reduce the noise tones of the corresponding frequency generated by the vibration of the generator, the wind turbine generator provided in the present embodiment further includes following features based on the fourth embodiment of the wind turbine generator of the present disclosure.

In some embodiments, the deployed control parameters are deployed control parameters of harmonic currents.

The deployed control parameter calculation unit 225 is specifically used for calculating the deployed control parameters of the harmonic currents according to the circulation currents generated by the generator winding under the operation of the non-faulty power transmission system.

The harmonic currents are currents which restrain the circulation currents. The deployed control parameters of the harmonic currents include: an amplitude, a phase, and a frequency.

In some embodiments, through monitoring the non-faulty power transmission system, collecting the circulation currents and determining the amplitude, the phase and the frequency of the circulation currents, it can be calculated that the amplitude of the harmonic currents is equal to the amplitude of the circulation currents, the phase of the harmonic currents is opposite to the phase of the circulation currents, and the frequency of the harmonic currents is equal to the frequency of the circulation currents.

The control unit of the non-faulty power transmission system 226 is specifically used for controlling the inverter module of the converter in the non-faulty power transmission system to inject the harmonic currents to eliminate the circulation currents according to the deployed control parameters of the harmonic currents.

Specifically, in the embodiment, the inverter module of the converter in the non-faulty power transmission system is controlled to generate and inject the harmonic current according to the amplitude, the phase and the frequency of the harmonic currents. Since the amplitude and the frequency of the harmonic currents are equal to the amplitude and the frequency of the circulation currents, and the phase of the harmonic currents is opposite to the phase of the circulation currents, the injected harmonic currents can eliminate the circulation currents. The elimination of the circulation currents reduces the radial force and the tangential force produced on the magnetic poles to the values when the faulty power transmission system is not removed, and further restrains the vibration of the generator and the noise tones.

In the wind turbine generator provided in the embodiment, after the removal control unit of the faulty power transmission system in the upper controller controls the faulty power transmission system to stop working according to the removing instruction and be removed from the wind turbine generator, the deployed control parameter calculation unit calculates the deployed control parameters of the harmonic currents according to the circulation currents generated by the generator winding under the operation of the non-faulty power transmission system; the control unit of the non-faulty power transmission system controls the inverter module of the converter in the non-faulty power transmission system to inject the harmonic currents to eliminate the circulation currents according to the deployed control parameters of the harmonic currents, not only making full use of the wind turbine generator, but also increasing the energy production of the wind turbine generator. The elimination of the circulation currents reduces the radial force and the tangential force produced on the magnetic poles to the values when the faulty power transmission system is not removed, and further restrains the vibration of the generator and the noise tones.

FIG. 7 is a flow chart of a control method of a wind turbine generator according to the present disclosure, and the control method of the wind turbine generator provided in the present embodiment is used for controlling the wind turbine generator provided in the above embodiments. Meanwhile, in order to better understand the embodiment, the structure and position relations of components may refer to FIG. 1. The control method of the wind turbine generator is applied in the wind turbine generator provided in the first embodiment of the present disclosure, and the wind turbine generator includes: at least two power transmission systems connected in parallel with each other; and a control system including an upper controller and control subsystems provided correspondingly to the power transmission systems, wherein each of control subsystems includes bottom controllers. The control method of the wind turbine generator provided in the present embodiment includes following steps 701 to 702.

In step 701, the bottom controllers monitor operating state parameters of functional units in the corresponding power transmission systems, and under the condition that it is determined that the corresponding functional units meet the abnormal conditions according to the operating state parameters, send the operating state parameters of the corresponding functional units to the upper controller.

In the embodiment, as shown in FIG. 2, for each of control subsystems, the bottom controllers are respectively: a central control module of a converter, a switch control module, a radiator control module of a generator winding and a radiator control module of a converter.

In the embodiment, the operating state parameters of the functional units in the power transmission systems monitored by each bottom controller correspondingly may be different according to the functional units.

In the embodiment, the method of each bottom controller determining whether the corresponding functional units meet the abnormal conditions according to the operating state parameters is not limited herein either.

In the embodiment, the description of each bottom controller monitoring the operating state parameters of the functional units in the power transmission systems correspondingly and the description of the method of each bottom controller determining whether the corresponding functional units meet the abnormal conditions according to the operating state parameters may refer to the corresponding description in the first embodiment of the wind turbine generator of the present disclosure specifically, which are not repeated herein.

In step 702, the upper controller generates operation instructions under the condition that it is determined that the faults of the corresponding functional units occur according to the operating state parameters of the corresponding functional units and control the faulty power transmission systems to work according to the operation instructions.

In the embodiment, the upper controller is connected to each bottom controller in the control subsystem, communicating via a bus or Ethernet.

Specifically, in the embodiment, the method of the upper controller determining whether the faults of the corresponding functional units occur according to the operating state parameters of the corresponding functional units is not limited herein. The abnormal conditions of each functional unit may be pre-stored, whether the operating state parameters of the corresponding functional units meet the abnormal conditions is determined, and if the determination is affirmative, it is determined that the faults of the corresponding functional unit occur. Other methods may also be adopted to determine whether the faults of the corresponding functional unit occur, which are not limited in the embodiment.

In the embodiment, after determining that the faults of the corresponding functional units occur, the method of sending the operation instructions is not limited either.

In the embodiment, the description of the controller determining whether the faults of the corresponding functional units occur according to the operating state parameters of the corresponding functional units and the description of the method of sending the operation instructions after determining that the faults of the corresponding functional units occur may refer to the corresponding description in the first embodiment of the wind turbine generator of the present disclosure specifically, which are not repeated herein.

In the control method the wind turbine generator provided in the embodiment, the operating state parameters of the functional units in the corresponding power transmission system are monitored through the bottom controllers; under the condition that it is determined that the corresponding functional units meet the abnormal conditions according to the operating state parameters, the bottom controllers send the operating state parameters of the corresponding functional units to the upper controller; the upper controller generates operation instructions under the condition that it is determined that the faults of the corresponding functional units occur according to the operating state parameters of the corresponding functional units, and controls the faulty power transmission systems to work according to the operation instructions. Since each of the power transmission systems in the wind turbine generator is connected in parallel with each other, and the same functional units of the power transmission systems are independent of each other, in a case where a functional unit fails, only the circuit where the functional unit is located is affected, and the normal operation of other power transmission systems is not affected. The bottom controllers may monitor the corresponding functional units independently, and after the upper controller determines that the corresponding functional units fail, the upper controller generates the operation instructions to control the faulty power transmission systems to work according to the operation instructions and the normal operation of the non-faulty power generation circuit is not affected, and therefore the wind turbine generator is made full use of, thereby increasing the energy production of the wind turbine generator.

Figure 8:
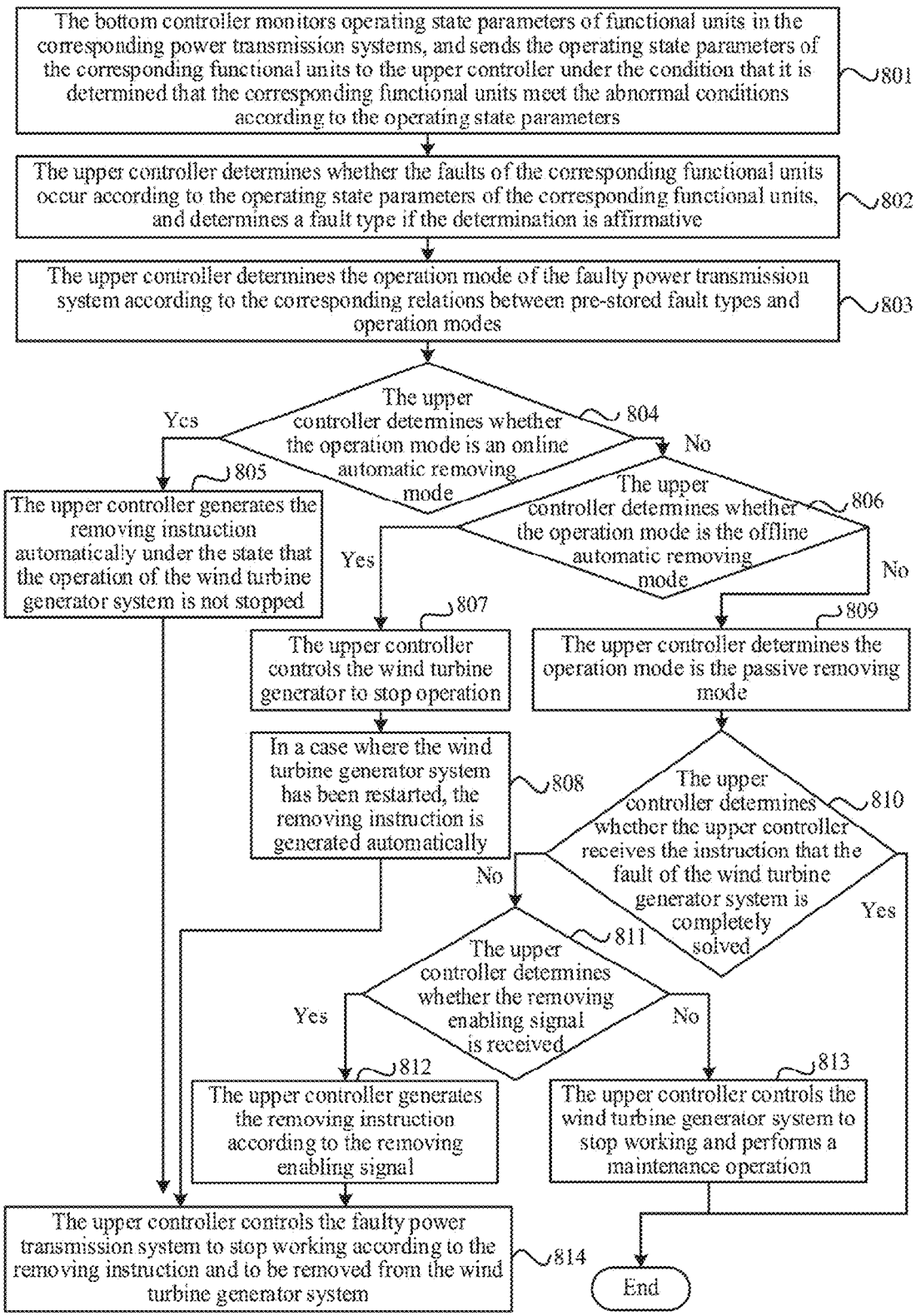
FIG. 8 is another flow chart of a control method of a wind turbine generator according to the present disclosure.

FIG. 8 is a flow chart of a second embodiment of a control method of a wind turbine generator according to the present disclosure. As shown in FIG. 8, the control method of the wind turbine generator provided in the present embodiment further defines the step 702 of the first embodiment of the control method of the wind turbine generator of the present disclosure, and meanwhile, in order to better understand the embodiment, the structure and position relations of components may refer to FIG. 3. The control method of the wind turbine generator provided in the present embodiment includes following steps 801 to 815.

In step 801, the bottom controllers monitor operating state parameters of functional units in the corresponding power transmission systems, and under the condition that it is determined that the corresponding functional units meet the abnormal conditions according to the operating state parameters, send the operating state parameters of the corresponding functional units to the upper controller.

In the embodiment, the implementation of step 801 is the same as that of step 701 in the control method of the first embodiment of the wind turbine generator in this disclosure, which are not repeated herein.

In step 802, the upper controller determines whether the faults of the corresponding functional units occur according to the operating state parameters of the corresponding functional units, and if the determination is affirmative, a fault type is determined.

In some embodiments, in the embodiment, the faults of the power transmission system may be classified in advance and the fault types are pre-stored. After determining that the faults of the corresponding functional units occur according to the operating state parameters of the corresponding functional units, the fault type of the corresponding functional unit is determined according to the pre-stored fault types.

In the embodiment, the fault types may be classified according to the operation mode. The fault type that the online automatic removing mode may be adopted is divided as a first type of the fault, the fault type that the offline automatic removing mode may be adopted is divided as a second type of the fault, and the fault type that the passive removing mode may be adopted is divided as a third type of the fault.

In step 803, the upper controller determines the operation mode of the faulty power transmission system according to the corresponding relations between the pre-stored fault types and the operation modes.

The operation mode refers to anyone of following modes:

An online automatic removing mode, an offline automatic removing mode and a passive removing mode.

Specifically, in the embodiment, the corresponding relations between the fault types and the operation modes are pre-stored. That is, the first type of the fault corresponds to the online automatic removing mode, the second type of the fault corresponds to the offline automatic removing mode, and the third type of the fault corresponds to the passive removing mode. According to the fault type to which the corresponding functional units belong, the corresponding relations between the pre-stored fault types and the operation modes are searched to determine the operation mode corresponding to the fault type to which the corresponding functional units belong.

In step 804, the upper controller determines whether the operation mode is the online automatic removing mode, and if the determination result is affirmative, step 805 is performed, otherwise, step 806 is performed.

In some embodiments, in the embodiment, the operation modes includes three types, whether the operation mode is the online automatic removing mode is determined firstly to perform a removing process most conveniently.

In step 805, the upper controller generates the removing instruction automatically under the state that the operation of the wind turbine generator is not stopped.

Since the faults corresponding to the online automatic removing mode are the faults that the power transmission system where the corresponding component is located may be removed without getting down, in a case where the operation mode is the online automatic removing mode, under the state that the operation of the wind turbine generator is not stopped, the removing instruction is generated automatically and step 814 is performed.

The first type of faults includes too high temperature of the radiator liquid of the converter, over-temperature of the temperature of the Du/Dt module of the converter and the like. These faults may be positioned to the functional units where the faults occur, further positioned to the power transmission system where the faults occur. Therefore, without getting down, it only needs to remove the faulty power transmission system.

In step 806, the upper controller determines whether the operation mode is the offline automatic removing mode, and if the determination result is affirmative, step 807 is performed, otherwise, step 809 is performed.

In step 807, the upper controller controls the wind turbine generator to stop operation.

In step 808, in a case where the wind turbine generator has been restarted, the removing instruction is generated automatically.

The embodiment is described in conjunction with steps 806 to 808. In the embodiment, the offline automatic removing mode is the mode that the faulty power transmission system is controlled to be removed automatically after getting down and restarting, and compared to the online automatic removing mode, in the offline automatic removing mode, it is necessary to remove the faulty power generation circuit automatically only after getting down and determining it can be restarted.

The second type of faults include: abnormal heartbeat signals of a single power generation circuit and the converter, loss of feedback of a water cooling UPS battery and the like, and fault points may not be positioned for these faults. The faulty power transmission system is recognized when the wind turbine generator has been restarted, then the faulty power transmission system is removed.

After step 808 is performed, step 814 is performed.

In step 809, the upper controller determines the operation mode is the passive removing mode.

In step 810, the upper controller determines whether the upper controller receives the instruction that the fault of the wind turbine generator is completely solved, and if the determination result is affirmative, it ends, otherwise, step 811 is performed.

In step 811, the upper controller determines whether the removing enabling signal is received, if the determination result is affirmative, step 812 is performed, otherwise, step 813 is performed.

In step 812, the upper controller generates the removing instruction according to the removing enabling signal.

In step 813, the upper controller controls the wind turbine generator to stop working and performs a maintenance operation.

The embodiment is described in conjunction with steps 809 to 813. Specifically, in the embodiment, in a case where the operation mode does not belong to the online automatic removing mode and the offline automatic removing mode, the operation mode may be determined as the passive removing mode. Where the passive removing mode is a removing mode that the technician is required to intervene so that it may be performed.

The third type of faults include: the fault of unbalanced three-phase currents of the winding of the single power generation circuit and the like. After the technician knows that the third type of the fault occurs on the wind turbine generator through the central control device and arrives in the scene, he determines the faults again, and solves the faults, and after the faults are completely solved, the instruction that the fault of the wind turbine generator is completely solved is sent to the upper controller through the central control device, so that the wind turbine generator may continue to generating the power without removing the faulty power transmission system. In a case where the fault occurs in one of power transmission systems which may not be solved in a short time, the removing enabling signal is sent to the upper controller through the central control device so that the upper controller generates the removing instruction according to the removing enabling signal. And step 815 is performed.

In step 814, the upper controller controls the faulty power transmission system to stop working according to the removing instruction and to be removed from the wind turbine generator.

In some embodiments, since the operation mode is any one of the removing mode, after the removing instruction is generated, the faulty power transmission system is controlled to stop working according to the removing instruction, and the faulty power transmission system is removed from the wind turbine generator.

In the control method of the wind turbine generator provided in the embodiment, the operating state parameters of the functional units in the corresponding power transmission system are monitored through the bottom controllers; under the condition that it is determined that the corresponding functional units meet the abnormal conditions according to the operating state parameters, the bottom controllers send the operating state parameters of the corresponding functional units to the upper controller, and the upper controller determines whether the faults of the corresponding functional units occur according to the operating state parameters of the corresponding functional units, determines a fault type if the faults occur, and determines the operation mode of the faulty power transmission system according to the corresponding relations between the pre-stored fault types and operation modes, where the operation mode is the online automatic removing mode, the offline automatic removing mode or the passive removing mode. The upper controller generates the operation instructions being removing instructions according to the operation mode, and controls the faulty power transmission system to stop working according to the removing instruction, to remove the faulty power transmission system from the wind turbine generator. For multiple types of the fault, the removing instructions are generated according to the corresponding removing mode, not only making full use of the wind turbine generator, but also increasing the energy production of the wind turbine generator. And for multiple types of the fault, if the fault may not be restored, the faulty power transmission system can be removed directly.

Figure 9:
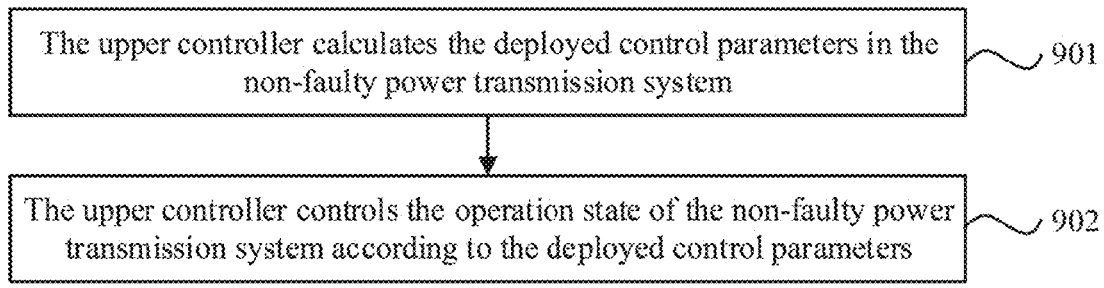
FIG. 9 is another flow chart of a control method of a wind turbine generator according to the present disclosure.

FIG. 9 is a flow chart of a third embodiment of a control method of a wind turbine generator according to the present disclosure. As shown in FIG. 9, the embodiment further includes following steps 901 to 902 after the upper controller controls the faulty power transmission system to stop working according to the removing instruction and be removed from the wind turbine generator based on the second embodiment of the control method of the wind turbine generator of the present disclosure.

In step 901, the upper controller calculates the deployed control parameters in the non-faulty power transmission system.

In some embodiments, the deployed control parameters include: torque setting values, given reactive values, inductance values, resistance values and magnetic chain data of the generator in the non-faulty power transmission system.

The inductance values, the resistance values and the magnetic chain data of the generator in the non-faulty power transmission system are parameters of the generator windings in the non-faulty power transmission system.

In some embodiments, the method of calculating the parameters of the generator windings in the non-faulty power transmission system may refer to the description of the fourth embodiment of the wind turbine generator.

In step 902, the upper controller controls the operation state of the non-faulty power transmission system according to the deployed control parameters.

In some embodiments, the upper controller controls the operation state of the generator in the non-faulty power transmission system according to the torque setting values, the given reactive values, the inductance values, the resistance values and the magnetic chain data of the generator in the deployed control parameters, enabling the generator to increase the energy production and meet the demand.

In the control method of the wind turbine generator provided in the embodiment, after the upper controller controls the faulty power transmission system to stop working and be removed from the wind turbine generator, the upper controller calculates the deployed control parameters of the non-faulty power transmission system, where the deployed control parameters include: torque setting values, given reactive values, inductance values, resistance values and magnetic chain data of the generator in the non-faulty power transmission system. The upper controller controls the operation state of the non-faulty power transmission system according to the deployed control parameters, not only making full use of the wind turbine generator, but also increasing the energy production of the wind turbine generator. And after the faulty power transmission system is removed, the non-faulty power transmission system may also meet the demand for power generation.

Figure 10:
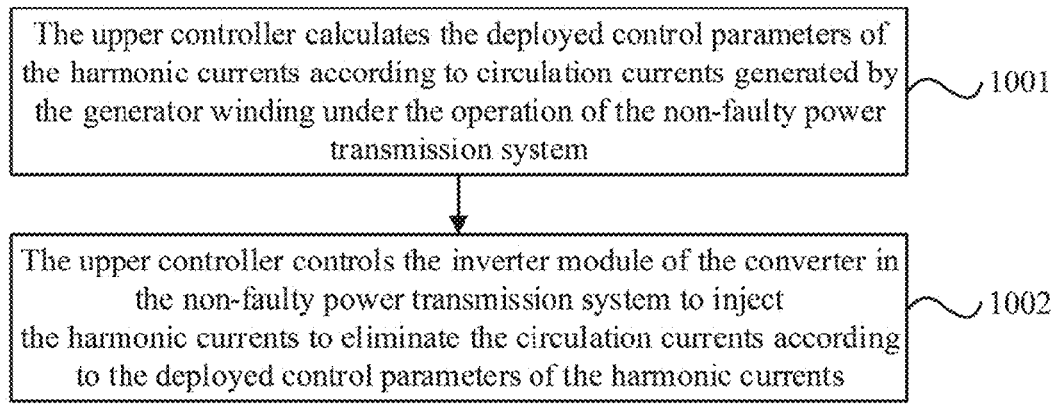
FIG. 10 is another flow chart of a control method of a wind turbine generator according to the present disclosure.

FIG. 10 is a flow chart of a control method of a wind turbine generator according to the present disclosure. As shown in FIG. 10, the embodiment further includes following steps 1001 to 1002 after the upper controls the faulty power transmission system to stop working according to the removing instruction and be removed from the wind turbine generator based on the third embodiment of the control method of the wind turbine generator of the present disclosure, wherein the deployed control parameters include deployed control parameters of harmonic currents.

In step 1001, the upper controller calculates the deployed control parameters of the harmonic currents according to circulation currents generated by the generator winding under the operation of the non-faulty power transmission system.

The harmonic currents are currents which restrain the circulation currents. The deployed control parameters of the harmonic currents include: an amplitude, a phase, and a frequency.

Specifically, in the embodiment, through monitoring the non-faulty power transmission system, collecting the circulation currents and determining the amplitude, the phase and the frequency of the circulation currents. It can be calculated that the amplitude of the harmonic currents is equal to the amplitude of the circulation currents, the phase of the harmonic currents is opposite to the phase of the circulation currents, and the frequency of the harmonic currents is equal to the frequency of the circulation currents.

In step 1002, the upper controller controls the inverter module of the converter in the non-faulty power transmission system to inject the harmonic currents to eliminate the circulation currents according to the deployed control parameters of the harmonic currents.

In some embodiments, in the embodiment, the inverter module of the converter in the non-faulty power transmission system is controlled to generate and inject the harmonic current according to the amplitude, the phase and the frequency of the harmonic currents, and since the amplitude and the frequency of the harmonic currents are equal to the amplitude and the frequency of the circulation currents, and the phase of the harmonic currents is opposite to the phase of the circulation currents, the injected harmonic currents can eliminate the circulation currents. The elimination of the circulation currents reduces the radial force and the tangential force produced on the magnetic poles to the values when the faulty power transmission system is not removed, and further restrains the vibration of the generator and the noise tones.

In the control method of the wind turbine generator provided in the embodiment, after the removal control unit of the faulty power transmission system in the upper controller controls the faulty power transmission system to stop working according to the removing instruction and be removed from the wind turbine generator, the upper controller calculates the deployed control parameters of the harmonic currents according to the circulation currents generated by the generator winding under the operation of the non-faulty power transmission system; the upper controller controls the inverter module of the converter in the non-faulty power transmission system to inject the harmonic currents to eliminate the circulation currents according to the deployed control parameters of the harmonic currents, not only making full use of the wind turbine generator, but also increasing the energy production of the wind turbine generator. The elimination of the circulation currents reduces the radial force and the tangential force produced on the magnetic poles to the values when the faulty power transmission system is not removed, further restrains the vibration of the generator and the noise tones caused by the vibration of the generator.

Figure 11:
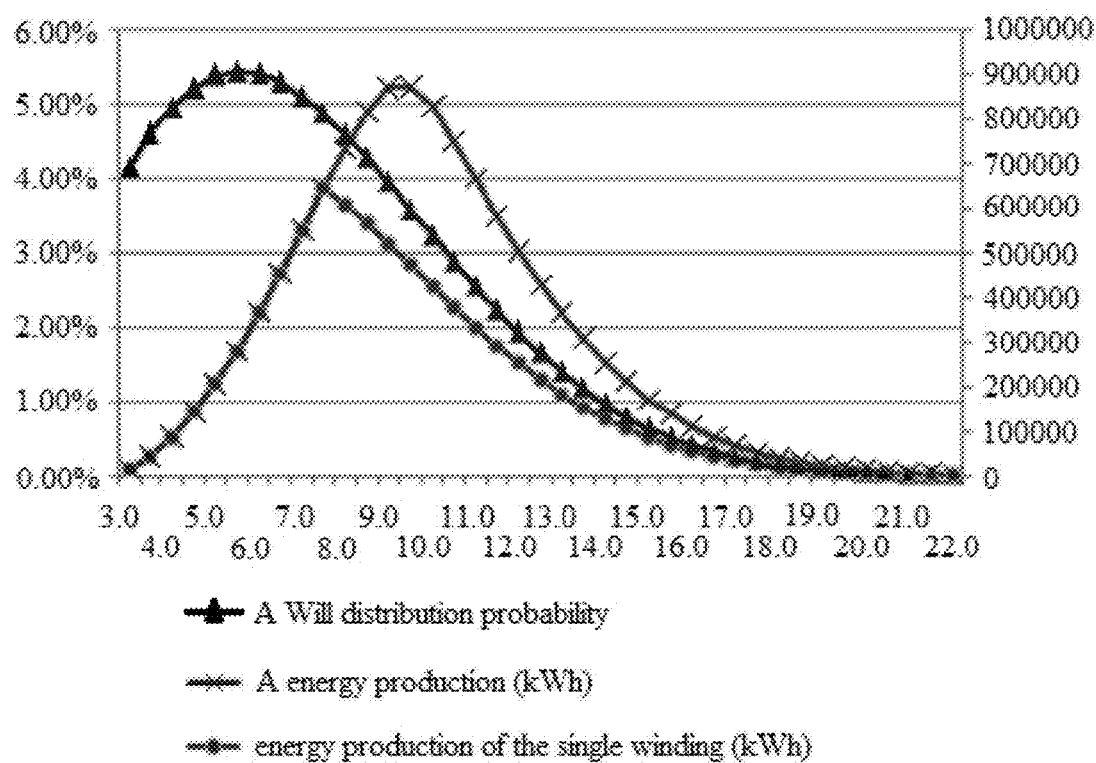
FIG. 11 is a schematic mode diagram of generating power by two power transmission systems and generating power with removing a power transmission system.

In order to describe the technical effect of the control method of the wind turbine generator provided in the present disclosure, a wind turbine generator of 3 MV is taken as an example. FIG. 11 is a schematic mode diagram of generating power by two power transmission systems and generating power after removing a power transmission system, wherein the horizontal coordinate in FIG. 11 is a wind speed, and the vertical coordinate on the left is the percentage of each wind velocity scope in a certain terrain condition, and the vertical coordinate on the right is the energy production.

As shown in FIG. 11, a curve with a mark of "▲" is a Will distribution probability curve, curves with the mark of "×" are curves of the energy production of the wind turbine generator of two power generation circuits, a curve with the mark of "●" is a curve of the energy production of the wind turbine generator after one set of power generation circuit is removed. For the wind turbine generator of 3 MV, in a case where the wind turbine generator operates at a half power of 1.5 MW, the control method of the wind turbine generator provided in the present disclosure is adopted, and after one set of power generation circuit is removed, the wind turbine still has the transmission capability of 1.5 MW. The whole power generation and transmission mode are as follows: since the generation power of the wind turbine generator is lower than 1.5 MW before the wind speed is lower than 7.5 m/s, in a case where the wind speed is between 3-7.5 m/s, the output of the whole machine is not affected after one set of wind turbine generator is removed; in a case where the wind speed is between 7.5-10.4 m/s, after one set of power generation circuit is removed, a contribution of the wind turbine generator may be constant at an output of 1.5 MW, but the contribution of two original wind turbine generators may be less than 3 MW, the loss of the output power is no more than 50%; in a case where the wind speed is between 10.4-22 m/s, after one set of power generation circuit is removed, a contribution of the wind turbine generator may be constant at an output of 1.5 MW, and the contribution of two original wind turbine generators are 3 MW, the loss of the output power is 50% of the original output power. In a case where a utilization rate of the whole wind turbine generator is 95%, after adopting the control method of the wind turbine generator provided in the present disclosure, the utilization rate of the wind turbine generator may increase to 98.3%, increasing by 3.36 percentage point, and the energy production increases 168282 KWH.

It is further proved that the control method of wind turbine generator provided by the disclosure not only makes full use of wind turbine generator, but also increases the energy production of the wind turbine generator.

In some embodiments, the present disclosure further provides an upper controller, where the upper controller includes one or multiple program modules, which are configured to be performed by one or multiple processors. One or multiple program modules include: a fault type determination unit 221, an operation mode determination unit 222 and an operation instruction generation unit 223. The functions of the fault type determination unit 221, the operation mode determination unit 222 and the operation instruction generation unit 223 may refer to the description above, which are not repeated herein.

In some embodiments, the present disclosure also provides a computer program product, where the computer program product includes: a computer readable storage medium and a computer program embedded therein, and the computer program includes instructions used for performing steps 802 to 814.

Preferably, the computer program further includes instructions used for performing steps S901 to S902.

Preferably, the computer program further includes instructions used for performing steps S1001 to S1002.

Those skilled in the art can understand that all or part of the steps to implement embodiments of the above methods can be completed through the hardware associated with the program instructions. The preceding program can be stored in a readable storage medium. When the program is executed, the steps that include embodiments of the above methods are performed; and the aforementioned storage media includes: ROM, RAM, disk or optical disk, and other media that can store program code.

Functional units of the upper controller in the embodiments of the present disclosure can be integrated in a processing module, also be separate physical units, or two or more units are integrated in one module. The above integrated modules can be implemented either in the form of hardware or in the form of a software function module. The integrated module can be stored in a computer readable storage medium if it is implemented as a software function module and is sold or used as an independent product. The storage medium mentioned above can be read only memory, disk, or optical disk.

The invention claimed is:

1. A wind turbine generator, comprising:
at least two power transmission systems connected in parallel with each other, wherein each of the power transmission systems comprises a power generation subsystem and a power transmission subsystem, functional units of the power generation subsystem comprise generator windings and generator winding radiators, functional units of the power transmission subsystem comprise machine side switches, converters, radiators of converters, network side switches and transformer windings, the generator windings, the machine side switches, the converters, the network side switches and the transformer windings are connected in series in turn, the generator winding radiators are used for cooling the generator windings, and the radiators of converters are used for cooling the converters;

a control system, wherein the control system comprises an upper controller and control subsystems provided correspondingly to the power transmission systems, and each of the control subsystems comprise bottom controllers;

wherein the bottom controllers are used for monitoring operating state parameters of functional units in corresponding power transmission systems, and under the condition that it is determined that corresponding functional units meet preset conditions according to the operating state parameters, sending the operating state parameters of the corresponding functional units to the upper controller;

the upper controller is used for generating operation instructions under the condition that it is determined that faults of the corresponding functional units occur according to the operating state parameters of the corresponding functional units and controlling the power transmission systems to work according to the operation instructions.

2. The wind turbine generator according to claim 1, wherein the bottom controller is arranged correspondingly to each functional unit of each of the power transmission systems, one end of the bottom controller is connected to the corresponding functional unit, and another end of the bottom controller is connected to the upper controller.

3. The wind turbine generator according to claim 2, wherein the bottom controllers comprises: a central control module of the converter, a switch control module, a radiator control module of the generator winding and a radiator control module of the converter.

4. The wind turbine generator according to claim 3, wherein,
the central control module of the converter comprises: a rectifier control sub-module and an inverter control sub-module;
the rectifier control sub-module is used for controlling working state of a rectifier module of the converter in the power transmission system and monitoring operating state parameters of the rectifier module;
the inverter control sub-module is used for controlling working state of an inverter module of the converter in the power transmission system and monitoring operating state parameters of the inverter module.

5. The wind turbine generator according to claim 3, wherein
the switch control module is used for controlling working state of the machine side switches and the network side switches.

6. The wind turbine generator according to claim 3, wherein the upper controller, the switch control module, the radiator control module of the generator winding and the radiator control module of the converter are provided in a main control cabinet;
the central control module of the converter is provided in the converter.

7. The wind turbine generator according to claim 3, wherein the upper controller further comprises:
a fault type determination unit, used for determining whether faults of the corresponding functional units occur according to the operating state parameters of the corresponding functional units, and if the faults occur, determining types of the faults;
an operation mode determination unit, used for determining an operation mode of the faulty power transmission system according to corresponding relations between pre-stored fault types and operation modes;
an operation instruction generation unit, used for generating operation instructions according to the operation mode.

8. The wind turbine generator according to claim 7, wherein the operation instruction generation unit comprises:
a first operation instruction generation module, a second operation instruction generation module and a third operation instruction generation module,
wherein in a case where the operation mode is an online automatic removing mode, the first operation instruction generation module is used for generating a removing instruction in a state where an operation of the wind turbine generator is not stopped;
in a case where the operation mode is an offline automatic removing mode, the second operation instruction generation module is used for controlling the wind turbine generator to stop operation, determining whether the stopped operation is restarted, and generating a removing instruction in a case where the stopped operation is restarted; and
in a case where the operation mode is a passive removing mode, the third operation instruction generation module is used for determining whether a removing enable signal is received, and generating a removing instruction according to the removing enable signal in a case where the removing enable signal is received.

9. The wind turbine generator according to claim 7, wherein the upper controller further comprises:
a removal control unit of a faulty power transmission system, used for controlling the faulty power transmission system to stop working according to the removing instruction and be removed from the wind turbine generator.

10. The wind turbine generator according to claim 9, wherein the upper controller further comprises:
a deployed control parameter calculation unit, used for calculating deployed control parameters in a non-faulty power transmission system; and
a control unit of a non-faulty power transmission system, used for controlling an operation state of the non-faulty power transmission system according to the deployed control parameters.

11. The wind turbine generator according to claim 10, wherein the deployed control parameters are deployed control parameters of harmonic currents;
correspondingly, the deployed control parameter calculation unit is further used for calculating the deployed control parameters of the harmonic currents according to circulation currents generated by the generator winding under the operation of the non-faulty power transmission system;
the control unit of the non-faulty power transmission system is further used for controlling the inverter module of the converter in the non-faulty power transmission system to inject the harmonic currents to eliminate the circulation currents according to the deployed control parameters of the harmonic currents; and
the deployed control parameters of the harmonic currents comprise: an amplitude, a phase, and a frequency.

12. A control method of a wind turbine generator, wherein the wind turbine generator comprises: at least two power transmission systems connected in parallel with each other, wherein each of the power transmission systems comprises a power generation subsystem and a power transmission subsystem, functional units of the power generation subsystem comprise generator windings and generator winding radiators, functional units of the power transmission subsystem comprise machine side switches, converters, radiators of converters, network side switches and transformer windings, the generator windings, the machine side switches, the converters, the network side switches and the transformer windings are connected in series in turn, the generator winding radiators are used for cooling the generator windings, and the radiators of converters are used for cooling the converters; and a control system comprising an upper controller and control subsystems provided correspondingly to the power transmission systems, wherein each of the control subsystems comprises bottom controllers;

the control method comprises:
the bottom controllers monitoring operating state parameters of functional units in corresponding power transmission systems, and under the condition that it is determined that corresponding functional units meet preset conditions according to the operating state parameters, sending the operating state parameters of the corresponding functional units to the upper controller;
the upper controller generating operation instructions under the condition that it is determined that faults of the corresponding functional units occur according to the operating state parameters of the corresponding functional units and controlling the power transmission systems to work according to the operation instructions.

13. The method according to claim 12, wherein the bottom controllers comprises: a central control module of a converter, a switch control module, a radiator control module of a generator winding and a radiator control module of the converter.

14. The method according to claim 13, wherein before the upper controller generating the operation instructions under the condition that it is determined that the faults of the corresponding functional units occur according to the operating state parameters of the corresponding functional units, the method further comprises:
storing corresponding relations between fault types and operation modes;
wherein the upper controller generating the operation instructions under the condition that it is determined that the faults of the corresponding functional units occur according to the operating state parameters of the corresponding functional units further comprises:
the upper controller determining whether the faults of the corresponding functional units occur according to the operating state parameters of the corresponding functional units, and determining a fault type if the determination is affirmative;
the upper controller determining an operation mode of the faulty power transmission system according to pre-stored corresponding relations between the fault types and the operation modes; and
the upper controller generating the operation instructions according to the operation mode.

15. The method according to claim 14, wherein the operation mode comprises anyone of following modes:
an online automatic removing mode, an offline automatic removing mode and a passive removing mode;
wherein the upper controller generating the operation instructions according to the operation mode further comprises:
in a case where the operation mode is the online automatic removing mode, the upper controller generating a removing instruction in a state where the operation of the wind turbine generator is not stopped;
in a case where the operation mode is the offline automatic removing mode, the upper controller controlling the wind turbine generator to stop the operation, determining whether the stopped operation is restarted, and generating a removing instruction in a case where the stopped operation is restarted; and
in a case where the operation mode is the passive removing mode, the upper controller determining whether the removing enable signal is received, and generating a removing instruction according to the removing enable signal in a case where the removing enable signal is received.

16. The method according to claim 15, wherein after the upper controller generates the removing instruction, the method further comprises:
the upper controller controlling the faulty power transmission system to stop working according to the removing instruction and be removed from the wind turbine generator.

17. The method according to claim 16, wherein after the upper controller controls the faulty power transmission system to stop working according to the removing instruction and be removed from the wind turbine generator, the method further comprises:
the upper controller calculating deployed control parameters in the non-faulty power transmission system; and
the upper controller controlling operation state of the non-faulty power transmission system according to the deployed control parameters.

18. The method according to claim 17, wherein the deployed control parameters are deployed control parameters of harmonic currents;
correspondingly, the upper controller calculating the deployed control parameters in the non-faulty power transmission system further comprises:
the upper controller calculating the deployed control parameters of the harmonic currents according to the circulation currents generated by the generator winding under the operation of the non-faulty power transmission system;
the upper controller controlling the operation state of the non-faulty power transmission system according to the deployed control parameters further comprises:
the upper controller controlling an inverter module of the converter in the non-faulty power transmission system to inject the harmonic currents to eliminate the circulation currents according to the deployed control parameters of the harmonic currents;
wherein the deployed control parameters of the harmonic currents comprise: an amplitude, a phase, and a frequency.

* * * * *